United States Patent
Douglas

(10) Patent No.: US 6,712,687 B1
(45) Date of Patent: Mar. 30, 2004

(54) BIG GAME GAMBREL

(75) Inventor: Donald L. Douglas, Petal, MS (US)

(73) Assignee: Vibrashine, Inc., Taylorsville, MS (US)

( * ) Notice: Subject to any disclaimer, the term of this patent is extended or adjusted under 35 U.S.C. 154(b) by 0 days.

(21) Appl. No.: 10/263,064

(22) Filed: Oct. 3, 2002

(51) Int. Cl.[7] .............................................. A22C 1/00
(52) U.S. Cl. ...................................................... 452/189
(58) Field of Search ................................ 452/187, 188, 452/189, 191, 192

(56) References Cited

U.S. PATENT DOCUMENTS

| | | | | |
|---|---|---|---|---|
| 708,608 A | * | 9/1902 | Zander | 452/192 |
| 1,311,779 A | * | 7/1919 | Shank | 452/189 |
| 2,331,566 A | * | 10/1943 | Pautz | 452/189 |
| 2,809,069 A | * | 10/1957 | Neel | 452/192 |
| 4,027,357 A | * | 6/1977 | Morris | 452/192 |
| 4,763,942 A | * | 8/1988 | Lyon | 452/192 |
| 5,591,077 A | * | 1/1997 | Rowe | 452/189 |
| 5,820,455 A | * | 10/1998 | Breedlove | 452/187 |

* cited by examiner

*Primary Examiner*—Thomas Price
(74) *Attorney, Agent, or Firm*—Volpe and Koenig, P.C

(57) ABSTRACT

Two tubular steel frames welded together to make a triangular shaped gambrel. One frame being bent at a 90 degree angle and welded to a straight second frame which is straight. The welding is completed in way so that a hole is defined at each end of the lower member. A cable is inserted through the entire length of the bent frame. Two loops are then defined on each of the left and right sides of the frame and are slidably secured to the lower frame member by a cable ferrule. As the animals' limbs are placed in each loop of the cable, the weight of the animal itself tightens the top loop, or cable thimble, which in turn tightens the bottom two loops of the cable. This tightening allows the body of the animal to remain in air for cleaning and dressing the animal.

17 Claims, 1 Drawing Sheet

BIG GAME GAMBREL

BACKGROUND OF THE INVENTION

The present invention is in relation to gambrels and other hanging devices constructed for hanging, dressing, and supporting large and small game, however this present invention is more modern, advanced, and different from all previous devices filed with the U.S. Patent Office.

Many gambrels and alterations of the like have been patented through the years. The device is used widespread by hunters to hang wild game, skin, and dress the animal which is necessary to remove all internals of the animal before using the meat for food. Although numerous adaptations of gambrels have been invented over time, they all incur differences from the "Big Game Gambrel".

In U.S. Pat. No. 1,311,779, entitled Adjustable Hanger, invented by Irvin F. Shank, a device for hanging hogs for dressing is provided. This invention consisted of two extensible bars each with a concaved end piece, one bar including serrations on its edge side with the other bar having straps fastened at their opposite edges which helped guide the two bars in their sliding movement. A rope is then used with loops at its ends which pass through the holes cut in the concaved ends of the bars and to which a ring is fastened, and afforded means whereby the hanger may be suspended. The loops are caught over the legs of the hog. After the two bars have been adjusted to the proper size of the hog to be raised and suspended by the device the loops will draw the legs of the hog against the concaved ends and securely hold the same.

This invention differs from the present invention in that the "Big Game Gambrel" is not constructed with rope, nor uses two adjustable base bars. The "Big Game Gambrel" is one triangular shaped steel frame consisting of one steel cable that is looped at its three ends of by an adjustable faral and is suspended by the top loop in the air. This present invention can not only be used for the dressing of hogs, but can also withstand the weight for dressing big game such as deer or elk, or can be used for the suspension of such small game as rabbit and squirrel.

In U.S. Pat. No. 3,894,313, titled Game Hanger, by inventor Wayne A. Miller, a collapsable frame is shown for supporting a slaughtered animal high in the air. The supportable frame is used so that the carcass is suspended high enough from the ground so that dogs and other animals can not reach it, the frame being of generally inverted U-shaped configuration when assembled and comprising interfitting metal conduits so to support a top conduit cross piece from which blocks and tackle support a hanger having a hook at each opposite end for putting through the legs of the animal carcass, the entire frame being supported erect above the ground by a nylon rope tied to a stake.

This patented invention differs from the present invention in that it is particularly adaptable for use in wilderness where there are no trees available from which a slaughtered animal can be supported. The present invention is suspended by a tree by it's top cable loop. This patented invention consists of a collapsible portable frame for the hanger. Also, a nylon rope is secured to stake that is driven into the ground. The present invention is one complete piece, resembling a coat hanger, there is no collapsible frame to hang from nor nylon rope provided to drive into the ground for support.

In U.S. Pat. No. 4,763,942, titled Gambrel, invented by Jess J. Lyon, a game holding gambrel is formed from a pair of plastic tubes attachable together by the use of a threaded coupling. Loops are provided at opposed ends of the assembled tubes with these loops being designed to receive the feet of the animal to be butchered. A plastic chain extends upwardly from the ends of the tube assembly and is attachable to a tree limb, or the like, so that the animal can be held in a suspended position. The gambrel may be disassembled into a compact package for storage and transportation.

The present invention differs dramatically from Lyon's invention purely by construction. The present invention is one steel frame, with no use of plastics or pvc piping. The present invention cannot be compacted nor stored. It is simply a one piece invention made of a steel frame and cable. The present invention is one of improvement from prior patented gambrels with new advantages. It can be constructed at low cost, labor, and susceptible to low prices of sale once reaching public market.

U.S. Pat. No. 3,188,130 to Pietrowicz is similar for its disclosure of a small game hanging device having a tubular body member through which a single piece of a thong member is looped. Movement of thong or strand into tubular body is prevented by a knot tied into loop adjacent to the outside of body. The size of the upper looped thong to hang the Peitrowicz device to a limb of a tree is varied by a sliding washer upperwardly and downwardly. Likewise, the lower, second and third looped thongs are varied in size by use of respective washers. However, none of the prior art developed shows such, and the Peitrowicz small game hanging device teaches away from the "Big Game Gambrel", owing to its use of washers to vary the size of its lowermost loops.

BRIEF SUMMARY OF THE INVENTION

This invention is used in the sport of big game hunting. The triangle-shaped invention shall be suspended in the air by the cable thimble, or top loop, of the 90 degree portion of the triangle around a tree or nail or structure enabling the Big Game Gambrel to hang above ground. Any type of big game (deer, hog, elk, etc.) can be suspended in air by placing two of the animals limbs through each of the two bottom loops of the triangle. As the animals' limbs are placed in each loop of the cable, the weight of the animal itself tightens the top loop, or cable thimble, which in turn tightens the bottom two loops of the cable. This tightening permits the body of the animal to remain stationary above air, resulting in easy access to clean the animal. This invention has been proven and tested to support big game animals up to 800 lbs.

BRIEF DESCRIPTION OF THE DRAWING

Referring to FIG. 1, a 60 inch long, 3/16 inch thick cable 12 secures the animal into the device. When the device is hoisted upward, this cable 12, along with the weight of the animal, secures the animal. A 3/16" cable thimble 14 forms a loop for an attachment to allow the device to be hoisted upward. This thimble 14 is secured by a 3/16" cable faral 16. The cable faral 16 binds the cable 12 together, securing the cable connection. Lower cable farals 18, 20 also assist in forming support loops 22, 24, respectively, helping support the connection of the cable 12, which has been tested to support animals up to 800 lbs. 3/8" inline openings 26, 28 are created inside of a 30 inch long, ½ inch thick EMT (electrical metallic tubing) pipe 30 to create a straight line passage for the cable 12 to pass through. EMT pipe is used to provide an upper frame 30 that houses the cable passage and a bottom frame 32 that supports the apparatus. The upper and bottom frames 30, 32 are welded together 34, 36 attaching the upper and bottom frames 30, 32.

DETAILED DESCRIPTION OF THE PREFERRED EMBODIMENT

Figure 1:
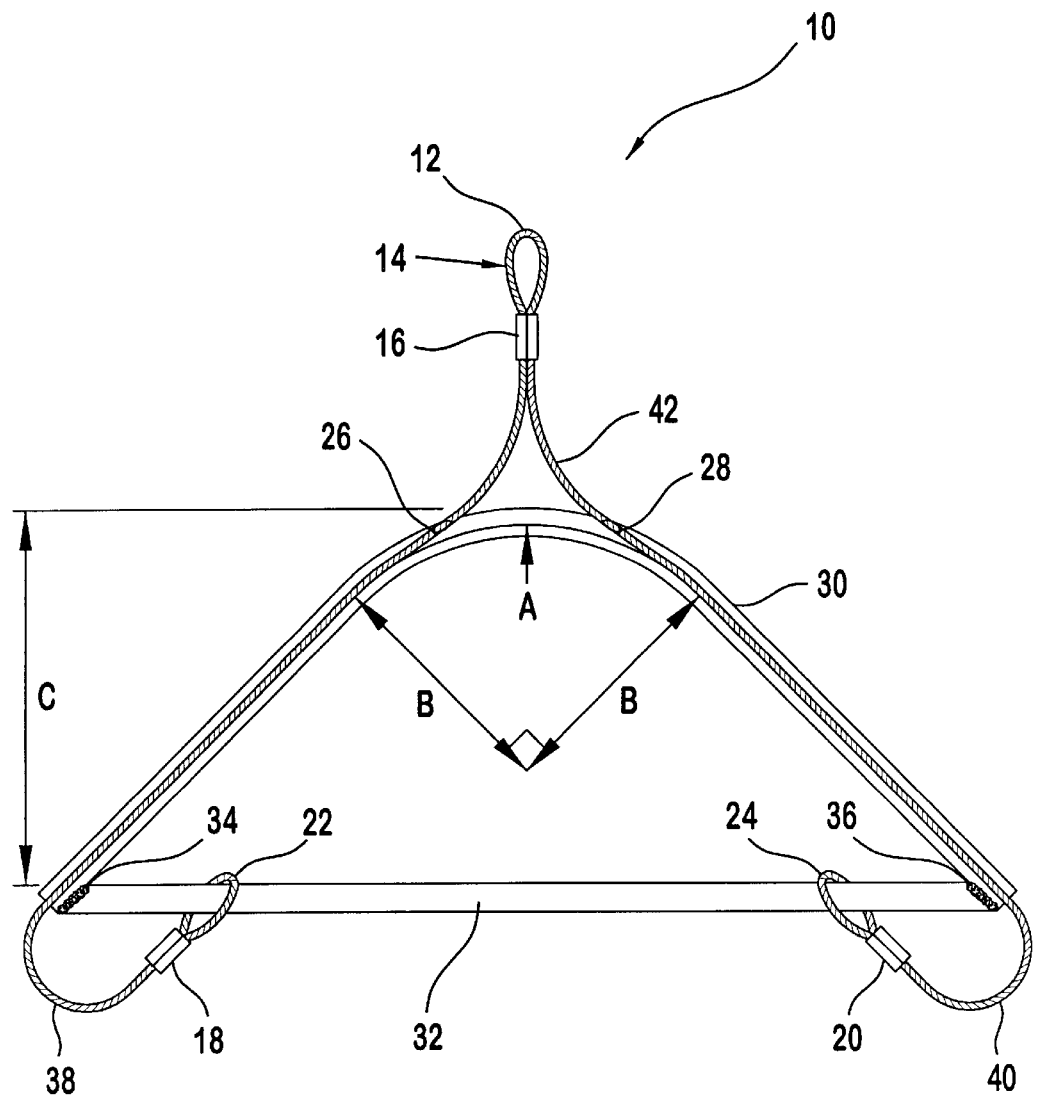
FIG. 1 is a frontal view of a preferred embodiment of the gambrel 10 of the present invention shown assembled.

Two EMT steel pipes 30, 32 and a steel cable 12 are the two main ingredients in the construction of this invention. The "Big Game Gambrel" as shown in FIG. 1, looks very similar to an oversized, steel-framed coat hanger. A 30 inch long, ½ inch size hollow EMT steel pipe 30 is shaped with a pipe bender until it is formed into a pipe with a 90 degree outside radius. As shown in FIG. 1, the length of the arc "A" is 8 inches, and the radius "B" of the arc is 5 3/32 inches. A straight 22 inch long, ½ inch size EMT steel pipe 32 is then placed and welded 34, 36 connecting with the two ends of the 90 degree pipe 30, leaving the hollow ends unimpeded. Together the two steel pipes 30, 32 are connected giving this invention the form of a coat hanger. The measurement "C" from the apex of the 90 degree pipe 30 down to the 22 inch straight steel pipe 32 should equal 8 inches.

Following the construction of the two EMT steel pipes 30, 32 into one "main frame", the next procedure is to drill two 3/8 inch holes 26, 28, 12½ inches apart, on the shoulder portion of the 90 degree pipe 30, making sure not to drill completely through the steel pipe 30. This allows you to run one 60 inch long, 3/16 inch wide steel cable 12 through each 3/8 inch hole 26, 28 until the steel cable 12 comes through the two hollow ends of what was the 90 degree pipe 30. To do this, take the 60 inch long, 3/16 inch wide cable 12 holding both ends in each hand. Then, proceed to probe the two ends of the cable 12 through the hollow interior of the 90 degree portion 30 of the main frame until both ends of the cable 12 are pushed through.

To complete "The Big Game Gambrel", the two free cable ends are to be looped around the 22 inch straight bottom pipe 32 and fastened with 3/16 inch cable farals 18, 20. The cable farals allow each of the two support loops 22, 24 to freely slide on the 22 inch bottom pipe 32 and also allows the length of the exposed lower portions of the cable 38, 40 to expand and contract. The portion of the cable 12 that can be observed on the 90 degree apex of the frame 30 is to be wrapped by a 3/16 cable faral 16, making a third loop 14. The length of the exposed upper portion of the cable 42 under this loop, or cable thimble 14, can expand and contract as the other two 38, 40. The loop 14 is used to hang the invention above the ground.

When the upper loop 14 is pulled away from the upper frame member 30, the length of the cable exposed at the left and right lower portions 38, 40 of the frame is reduced, thereby reducing the size of the respective adjustable size lower loops 38, 40. As the animal's limbs are placed in each loop 38, 40 of the cable 12, the weight of the animal itself tightens the length of the exposed cable 42 under the top loop, or cable thimble 14, which in turn tightens the bottom two loops 38, 40 of the cable. This tightening allows the body of the animal to remain in air for cleaning and dressing the animal.

What is claimed is:

1. A gambrel comprising:
  a tubular support means, the tubular support means comprising a bottom frame member and a curved upper frame member forming a nearly triangular shape, the upper frame member having exposed openings at the both ends of the tube and opposing inline openings approaching the apex of the curve; and
  an elongated flexible material, the elongated flexible material having two free ends slidably connected to the bottom frame member, the elongated flexible material being partially enclosed by the upper frame member and having an exposed upper portion at the apex of the upper frame member and exposed lower portions at the two-free ends connected to the bottom frame member, the exposed upper portion of the elongated flexible material functioning as a means to hang the gambrel, the exposed lower portions of the elongated flexible material being adapted to secure the legs of an animal;
  wherein as the exposed upper portion of the elongated flexible material is pulled away from the upper frame member, the length of the exposed lower portions of the elongated flexible material securing the animal is reduced, allowing the animal to be secured in the air.

2. The gambrel of claim 1, wherein the bottom frame member is welded to the curved upper frame member.

3. The gambrel of claim 1, wherein the tubular support means is comprised of electrical metallic tubing.

4. The gambrel of claim 1, wherein the curved upper frame member is thirty (30) inches long and one-half (½) inch thick.

5. The gambrel of claim 1, wherein the lower frame member is twenty (22) inches long and one-half (½) inch thick.

6. The gambrel of claim 1, wherein the curved upper frame has a ninety (90) degree arc.

7. The gambrel of claim 1, wherein the elongated flexible material is a cable.

8. The gambrel of claim 7, wherein the cable is sixty (60) inches long and three-eighth (3/8) inch thick.

9. The gambrel of claim 1, wherein the exposed upper portion of the elongated flexible material is fastened together to form a fixed size upper loop.

10. The gambrel of claim 9, wherein the exposed upper portion of the elongated flexible material is fastened together using a cable faral.

11. The gambrel of claim 1, wherein each free end of the exposed lower portion of the elongated flexible material is fastened together to form a fixed size connecting loop around the bottom frame member.

12. The gambrel of claim 11, wherein each free end of the exposed lower portion of the elongated flexible material is fastened together using a cable faral.

13. A gambrel comprising:
  a rigid frame having a horizontal member, a first guide member upwardly extending from said horizontal member at a first position and a second guide member upwardly extending from said horizontal member at a second position spaced from said first position at a selected distance; and
  a cable having first and second ends configured in loops and an intermediate hanging portion, said cable disposed on said frame such that said first end loop is slideably disposed on said frame horizontal member between said first and second positions so that said cable extends from said first end loop to said first guide member and is upwardly guided by said first guide member and said second end loop is slideably disposed on said frame horizontal member between said first end loop and said second position so that said cable extends from said second end loop to said second guide member and is upwardly guided by said second guide member whereby said intermediate hanging portion of said cable is disposed above said first and second guide members.

14. The gambrel of claim 13 wherein upper ends of said first and second guide members are connected such that said frame has a substantially triangular shape.

15. The gambrel of claim 13, wherein the first and second guide members are a continuous tube having a ninety degree arc with inline openings approaching the apex of the arc.

16. The gambrel of claim 13 wherein said intermediate hanging portion of said cable is formed into a loop by use of a cable faral.

17. A method of hanging game comprising:

providing a gambrel having a rigid frame in association with a cable where the rigid frame has a horizontal member, a first guide member upwardly extending from said horizontal member at a first position and a second guide member upwardly extending from said horizontal member at a second position spaced from said first position a selected distance, and the cable has first and second ends configured in loops and an intermediate hanging portion, said cable disposed on said frame such that said first end loop is slideably disposed on said frame horizontal member between said first and second positions so that said cable extends from said first end loop to said first guide member and is upwardly guided by said first guide member and said second end loop is slideably disposed on said frame horizontal member between said first end loop and said second position so that said cable extends from said second end loop to said second guide member and is upwardly guided by said second guide member whereby said intermediate hanging portion of said cable is disposed above said first and second guide members;

encircling a first leg portion of a game animal between said horizontal frame member and a potion of said cable extending from said first cable end;

encircling a second leg portion of a game animal between said horizontal frame member and a potion of said cable extending from said second cable end; and hanging the gambrel from said intermediate hanging portion of said cable to suspend the game animal in the air whereby the weight of the animal causes a self tightening of the cable about the encircled first and second leg portions.

* * * * *

UNITED STATES PATENT AND TRADEMARK OFFICE
CERTIFICATE OF CORRECTION

PATENT NO. : 6,712,687 B1 Page 1 of 1
APPLICATION NO. : 10/263064
DATED : March 30, 2004
INVENTOR(S) : Donald L. Douglas It is certified that error appears in the above-identified patent and that said Letters Patent is hereby corrected as shown below:

Column 1,
Line 36, after "ends", delete "of".

Column 6,
Lines 12 and 15, after "a", delete "potion" and insert -- portion --.

Signed and Sealed this

Twentieth Day of June, 2006

JON W. DUDAS
*Director of the United States Patent and Trademark Office*